(12) United States Patent
Qi et al.

(10) Patent No.: US 11,368,812 B2
(45) Date of Patent: Jun. 21, 2022

(54) METHOD AND SYSTEM FOR ADAPTING POSITIONING TECHNIQUES USING SPATIAL DISTRIBUTION PROBABILITIES

(71) Applicant: Telefonaktiebolaget LM Ericsson (publ), Stockholm (SE)

(72) Inventors: Kunpeng Qi, Shanghai (CN); Åke Busin, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/756,248

(22) PCT Filed: Dec. 21, 2017

(86) PCT No.: PCT/EP2017/084011
§ 371 (c)(1),
(2) Date: Apr. 15, 2020

(87) PCT Pub. No.: WO2019/081049
PCT Pub. Date: May 2, 2019

(65) Prior Publication Data
US 2021/0195374 A1 Jun. 24, 2021

(30) Foreign Application Priority Data
Oct. 26, 2017 (WO) ............... PCT/CN2017/107795

(51) Int. Cl.
*H04W 24/00* (2009.01)
*H04W 4/029* (2018.01)
*G01S 5/02* (2010.01)

(52) U.S. Cl.
CPC ........... *H04W 4/029* (2018.02); *G01S 5/0252* (2013.01)

(58) Field of Classification Search
CPC ............................ H04W 64/00; H04W 4/029
USPC ........... 455/456.1, 446, 436, 407, 406, 450, 455/456.4, 404.2, 445, 456.3
See application file for complete search history.

(56) References Cited

U.S. PATENT DOCUMENTS

| | | | |
|---|---|---|---|
| 2001/0022558 A1* | 9/2001 | Karr, Jr. ................. | G01S 1/028 342/450 |
| 2003/0064735 A1* | 4/2003 | Spain .................... | G01S 5/0252 455/456.1 |

(Continued)

FOREIGN PATENT DOCUMENTS

WO 2003102620 A1 12/2003

OTHER PUBLICATIONS

International Search Report and Written Opinion of the International Searching Authority for PCT International Application No. PCT/EP2017/084011 dated Jun. 20, 2018.

(Continued)

*Primary Examiner* — Joseph Arevalo
(74) *Attorney, Agent, or Firm* — Sage Patent Group

(57) ABSTRACT

Systems and methods are provided for a network node in a wireless communication network for generating an estimated location of a user equipment (UE). The method includes: receiving a request positioning message, determining the estimated location of the UE using a positioning technique, and adjusting the estimated location of the UE based on one or more spatial distribution probabilities associated with one or more locations in a vicinity of the estimated location.

19 Claims, 12 Drawing Sheets

(56) References Cited

U.S. PATENT DOCUMENTS

| | | | | |
|---|---|---|---|---|
| 2004/0180671 A1* | 9/2004 | Spain, Jr. | ............ | H04W 64/00 |
| | | | | 455/456.1 |
| 2007/0207816 A1* | 9/2007 | Spain, Jr. | ............ | H04W 64/00 |
| | | | | 455/456.1 |
| 2013/0130718 A1* | 5/2013 | Sharma | ............ | H04W 4/023 |
| | | | | 455/456.3 |
| 2014/0269491 A1* | 9/2014 | Edge | ............ | H04W 40/24 |
| | | | | 370/328 |
| 2015/0346313 A1* | 12/2015 | Smith | ............ | G01S 5/0242 |
| | | | | 342/465 |
| 2016/0097651 A1* | 4/2016 | Jung | ............ | G01C 21/3679 |
| | | | | 701/428 |
| 2016/0192314 A1* | 6/2016 | Leppänen | ............ | H04W 64/00 |
| | | | | 455/456.1 |
| 2017/0042717 A1* | 2/2017 | Agrawal | ............ | A61F 5/024 |

OTHER PUBLICATIONS

Mondal et al., "An Efficient Grid-based RF Fingerprint Positioning Algorithm for User Location Estimation in Heterogeneous Small Cell Networks," International Conference on Localization and GNSS 2014 (ICL-GNSS 2014), Helsinki, 2014, pp. 1-5.

Kemppi et al., "Database Correlation Method for Multi-System Positioning," 2006 IEEE 63rd Vehicular Technology Conference, Melbourne, Vic., 2006, pp. 866-870.

* cited by examiner

600

| N Training SIGs |
|---|
| SIG 1 |
| SIG 2 |
| . . . |
| SIG 100 |

FIG. 6

METHOD AND SYSTEM FOR ADAPTING POSITIONING TECHNIQUES USING SPATIAL DISTRIBUTION PROBABILITIES

CROSS REFERENCE TO RELATED APPLICATIONS

This application is a 35 U.S.C. § 371 national stage application of PCT International Application No. PCT/EP2017/084011 filed on Dec. 21, 2017, which itself is a continuation of PCT International Application No. PCT/CN2017/107795, filed Oct. 26, 2017, the disclosures and contents of which are incorporated by reference herein in their entireties.

TECHNICAL FIELD

Embodiments of the subject matter disclosed herein generally relate to methods and systems for determining a location of user (i.e., positioning) in radio communication systems and, more particularly, to methods and systems for refining positioning techniques using spatial distribution probabilities, i.e., probabilities associated with a user actually being in various locations, when determining the location of the user.

BACKGROUND

Accurately determining the location of a mobile user within a wireless communication network is an ongoing challenge in wireless telecommunications development. Government mandates, such as the E-911 positioning requirements in North America, and commercial Location Based Services (LBS) demand rapid and accurate position determination for user equipment (UE). Determining a location of user equipment is frequently referred to as "positioning". The accurate positioning of a UE becomes more challenging when considering indoor scenarios where, for example, Global Positioning System (GPS) signals are less detectable. In general, positioning based on received signal strengths from base stations is typically highly sensitive to the effects of signal attenuation, reflection and scattering.

Several positioning methods, of varying accuracy and complexity, are known in the art. These include cell ID positioning, Round Trip Timing (RTT) positioning, Observed Time Difference of Arrival (OTDOA) positioning, Assisted(A)-GPS positioning, and fingerprinting positioning. Some of these positioning techniques, which are based on received signal strengths, assume knowledge about base station positions and use trilateration or triangulation methods. Trilateration determines the position of a user equipment (UE) (or other device) by measuring distances to base stations with known positions. Triangulation determines the position of the UE by inferring the position based on measured angles to base stations. Both trilateration and triangulation are highly sensitive to errors caused by signal attenuation, reflection and scattering.

Fingerprinting positioning technologies, also known as radio pattern matching (RPM) or radio signal positioning (RSP), represent a family of path-loss based technologies that rely on matching the radio frequency (RF) environment, as experienced by the UE, to the known, estimated or otherwise mapped characteristics of the larger RF system in which the UE is operating in order to generate position or location information for the UE. A basis for fingerprinting positioning is to create a database of fingerprint training signatures from the area in which users are to be located.

To create the database of fingerprint training signatures, initially the area is divided into a grid of blocks or squares. Measurement samples taken within each of the grid squares can form one or more fingerprint training signatures to represent signal characteristics associated with those grid squares. Location of the grid center point can also be used as the ground truth of a fingerprint training signature. Ground truth can include location information such as latitude, longitude and height values (e.g., height above local ground level and/or height above sea level). Additionally, grid squares with no measurement samples in the grid square can be ignored.

Fingerprint positioning can be conducted by comparing a measurement sample, s, for positioning received from the UE to fingerprint training signatures and then returning the location of the best matching fingerprint training signatures. This technique can be (but is not required to be) entirely network based, so modifications are not needed in the UEs. The database comparison can be based on a least mean square (LMS) approach. The value, which is called similarity here, for the $n^{th}$ fingerprint training signature, is shown in Equation (1) below:

$$d(n) = \sqrt{\sum_i (s_i - g_i(n))^2 + \sum_j (s_j - l_{max})^2 + \sum_k (l_{max} - g_k(n))^2} \quad (1)$$

where $s_i$ is the signal strength of the measurement sample s on the $i^{th}$ cell and $g_i(n)$ is the signal strength of the $n^{th}$ fingerprint training signature on the same cell.

The first summation term of Equation (1) is taken over the hearable cells that are found in both of the fingerprints. The second summation term represents the penalty term for those cells that are hearable in the measurement sample s but not in the $n^{th}$ fingerprint training signature. Correspondingly, the third summation term defines the penalty term for those cells that are hearable in the nth fingerprint training signature, but not in the measurement sample S. $I_{max}$ represents the missing signal level values. Using a Weighted K Nearest Neighbor (WKNN) algorithm, the estimated position is described as shown below with respect to Equation (2):

$$\text{EstPos} = \sum_{n=1}^{N} (w(n) * P(n)) \quad (2)$$

where, P(n) is the position of the nth fingerprint training signature and where w(n) is expressed as shown below in Equation (3):

$$w(n) = \frac{\frac{1}{d(n)}}{\sum_{n=1}^{N} \frac{1}{d(n)}} \quad (3)$$

An example of a fingerprinting positioning technique will now be described with respect to FIGS. 1 and 2. FIG. 1 shows how a network node, e.g., a location server, can operate to estimate the position of a UE, as well as to generate a proximity region within which the UE is located. For example, the location server can use the measured fingerprint 10 associated with the UE whose location is being determined to search for similarities between the measured fingerprint 10 and other, reference fingerprints 20 as indicated by block 30. As outputs, the location server can generate both an estimated position of the UE and a proximity region within which the fingerprinting positioning technique indicates that the UE is located as shown by block 30. A graphical example of an estimated UE position including a proximity region associated with the UE generated using a fingerprinting positioning technique, as well as the actual UE position, is illustrated in FIG. 2. Specifically, FIG. 2 shows an area 200, the proximity region 202 which is the area in which the UE (and hence the user) is believed to be located and the optimized UE location 204 for reference. In this context, while the estimated UE location 204 is the system's "best guess" as to the UE's location, the proximity region is the region within which the system is X % certain that the UE is located, i.e., a predetermined confidence level. While fingerprinting positioning was used in this example, other positioning techniques can be used to provide similar estimates of the UE's position.

While various positioning techniques provide estimates of the location of a UE and by extension a user, various elements can negatively influence the accuracy of the positioning estimate. Additionally, not all potentially available information is always collected and/or used in the positioning process. For example, using the fingerprinting positioning example described above, only the similarity between request measurement(s) and reference measurements are considered. The actual probability of a UE being at a specific location based on other factors is not considered. This has the implication that the positioning algorithm generates an unnecessarily large uncertainty area as it includes areas which are, in practice, rarely visited by UEs (and their users).

Accordingly, it would be desirable to provide systems and methods that avoid the afore-described problems and drawbacks and which, more specifically, provide better location accuracy when using positioning techniques.

SUMMARY

Embodiments allow for considering the probability of a user being in an area when using positioning techniques to reduce the size of the area in which the user is likely located. This can provide a reduced statistical positioning error which in turn can provide a better quality for various Location Based Services as the service will be optimized for more users.

According to an embodiment, there is a method for a network node in a wireless communication network for generating an estimated location of a user equipment (UE). The method includes: receiving a request positioning message, determining the estimated location of the UE using a positioning technique, and adjusting the estimated location of the UE based on one or more spatial distribution probabilities associated with one or more locations in a vicinity of the estimated location.

According to another embodiment, there is a network node in a wireless communication network for generating an estimated location of a user equipment (UE). The network node includes: a receiver configured to receive a request positioning message; a processor configured to determine the estimated location of the UE using a positioning technique; and the processor configured to adjust the estimated location of the UE based on one or more spatial distribution probabilities associated with one or more locations in a vicinity of the estimated location.

According to another embodiment, there is a computer-readable storage medium containing a computer-readable code that when read by a computer causes the computer to perform a method generating an estimated location of a user equipment (UE) including: receiving a request positioning message; determining the estimated location of the UE using a positioning technique; and adjusting the estimated location of the UE based on one or more spatial distribution probabilities associated with one or more locations in a vicinity of the estimated location.

According to another embodiment, there is an apparatus adapted to receive a request positioning message, determine an estimated location of a user equipment (UE) using a positioning technique, and to adjust the estimated location of the UE based on one or more spatial distribution probabilities associated with one or more locations in a vicinity of the estimated location.

According to another embodiment, there is an apparatus including: a first module configured to receive a request positioning message; a second module configured to determine the estimated location of the user equipment using a positioning technique; and a third module configured to adjust the estimated location of the UE based on one or more spatial distribution probabilities associated with one or more locations in a vicinity of the estimated location.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6. shows a table of N training signatures;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As mentioned above in the Background, it can be desirable to provide better location accuracy when using positioning techniques. More specifically, by considering the probability of a user equipment (UE) being at certain locations, positioning techniques can indicate a smaller geographical area where a user is likely located which provides a reduced statistical positioning error and which, in turn, can optimize the quality for various Location Based Services. Embodiments will now be described generally from the point of view of using fingerprinting positioning and showing how the probability of a UE being at certain locations can be determined and used to refine the estimated location generated by the fingerprinting positioning technique, however it is to be understood that positioning techniques other than fingerprinting can make use of these embodiments.

Figure 3:
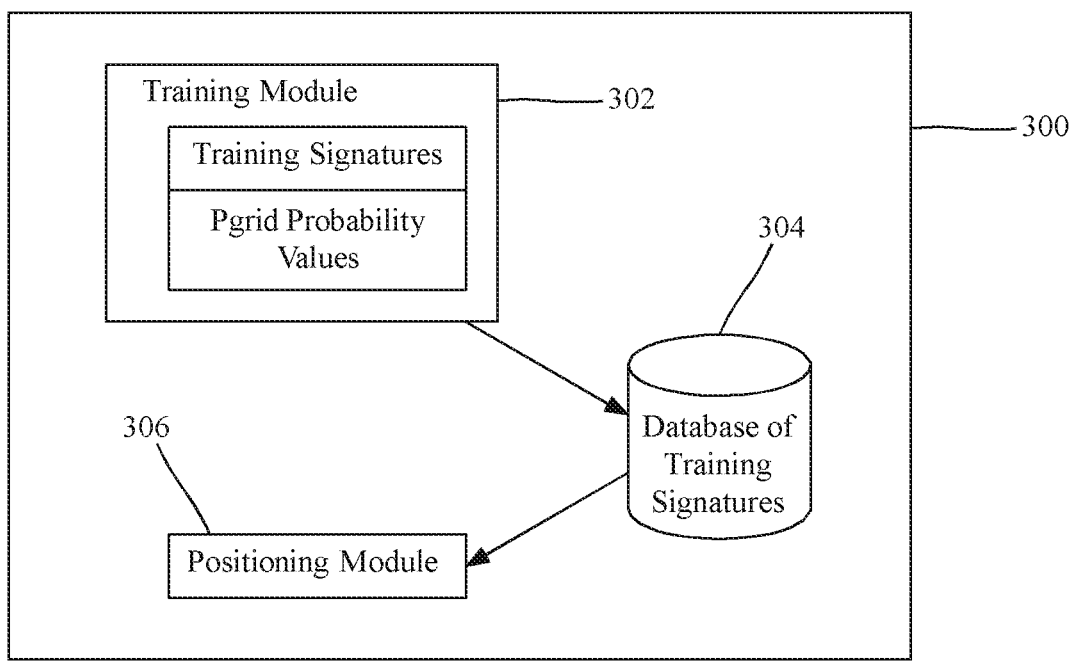
FIG. 3 depicts a network node configured to estimate a location of a user equipment (UE) according to an embodiment.

According to an embodiment, as shown in FIG. 3, there is a network node 300, e.g., a location server 300, which includes a training module 302, a database of training signatures 304 and a positioning module 306 for generating a fingerprinting position for a UE. According to an embodiment, training module 302 fetches Minimization of Drive Testing/Remote Drive Testing (MDT)/(RDT) measurements (or other online collected measurements) and creates the database of fingerprint training signatures 304. The positioning module 306 estimates location using both traditional positioning technique information, e.g., fingerprint positioning information, as well as using "spatial distribution probability" information to generate a reduced estimated area within which a user is expected to be located. "Spatial distribution probability", as used herein, describes using geographical information and/or temporal information (and/or potentially other information) to generate a probability of a person appearing at various locations within an area to improve estimates of a user's location.

According to an embodiment, as described above, measurement samples can be collected from MDT/RDT, online or from a random fraction of a subscriber base. The measurement sample may, for example, include: ground truth, e.g. longitude, latitude and height, time that the measured information is received or created, the cell IDs that are detected by the UE, quantized signal strength measurement, with respect to multiple cells, performed by the UE and quantized timing advance. Note, an associated ID of the cell may also be needed.

The MDT procedure provides an easy and efficient way to gather information to create large fingerprint training signature databases, since the MDT procedure allows collecting user experienced coverage and service quality related information associated with detailed location from a GNSS receiver, see, for example, technical specifications 3GPP TR 36.805 and 3GPP TS 37.320. Similar comments apply for RDT procedures.

According to an embodiment, a geographical area can be divided into grid locations, with each grid location having one or more fingerprint training signatures associated therewith. These fingerprint training signatures, based on the measurement samples, can include one or more of: ground truth, e.g., longitude, latitude and height, the cell IDs that are detected by the terminal, in each grid location, expectation of the received signal strength on cell or average of the received signal strength on cell with respect to multiple cells, variance of the received signal strength on cell with respect to multiple cells, expectation of the Timing Advance, variance of the Timing Advance as well as duration and number of measurement samples pair lists inside this grid or inside the expanded area of this grid.

As described above, fingerprint training signatures can be generated based on received radio signal measurements. When generating these fingerprint training signatures, or at another time as desired, UE presence information, which can be a portion of the spatial distribution information can be collected. Essentially to generate UE presence information the system can, for example, count the number of times that UEs are actually present at each of the grid locations over time. This UE presence information can be used to generate the spatial distribution probability of one or more people actually appearing in each grid location.

According to an embodiment, the system can use the same set of measurement samples (UE presence information) to determine the spatial distribution probability associated with a grid location that are used to establish the training sequence used for fingerprinting positioning for that grid location. Alternatively, to increase the robustness of the spatial distribution probability, the system can use an expanded area for a grid location to increase the number of measurement samples used to calculate the spatial distribution probability, i.e., the system can use a different set of measurement samples to calculate spatial distribution probability associated with a grid location than were used to calculate the training sequence for that grid location. For example, if the length of the grid location is 10 meters square, a square of length 20 meters can be used to increase the number of measurement samples used to calculate the spatial distribution probability for that grid location. These grid measurement options can also be coupled with geographic information and/or time (or time duration) information to generate the spatial distribution probability of one or more people appearing in the grid location.

Figure 4:
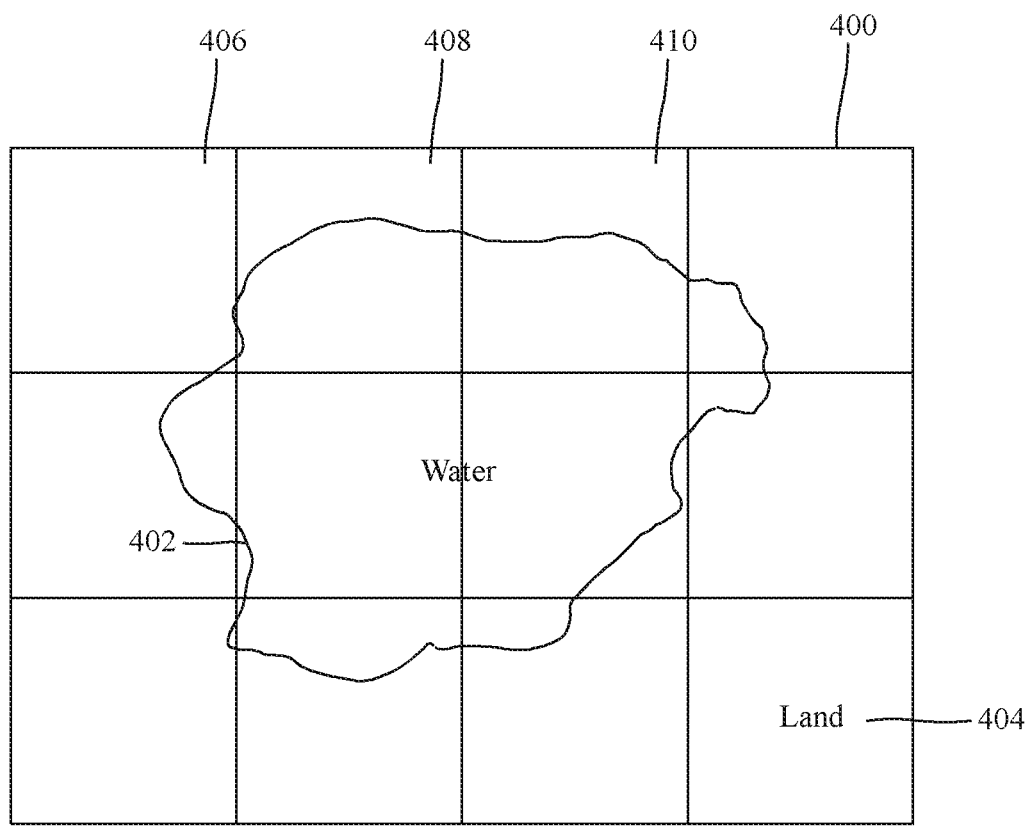
FIG. 4 shows a plurality of grid locations according to an embodiment.

In addition to correlating UE presence information with grid locations to determine the spatial distribution probability, other factors such as geography and/or time of day can be used to generate spatial distribution probability values. Considering first geography as it can affect the probability of a person appearing in a grid location, FIG. 4 shows an area 400 which includes a water area 402 and a land area 404. Further, the location 400 can be broken down into a plurality of grid locations, e.g., 406, 408 and 410. For example, according to one embodiment, it can be assumed that the probability of a person being in the water area 402 is less than that that of a user (person) being on the land area 404. This probability can be refined in various ways. For example, by comparing the size of the water area 402 to the land area 404 and/or observations/measurements of the appearance of users in these areas over time.

According to an embodiment, the probability of a user being in a grid location can also be refined by considering the time of day. This time element can be used in conjunction with geographical data, measurement data or alone to improve the location estimate of the user. Considering this time parameter as part of the spatial distribution probability determination, it is reasonable to assume that at different times of the day, week and month, for example, the probability that people appear in a place can be different. For example, people typically appear less frequently at night in an office, but mostly stay in the office during working hours. Thus, according to some embodiments, the system can generate different spatial probability distribution values for each grid location for different times of day.

Examples of how to classify durations of time include: working time in working days, not working time in working days and not working days. It is to be understood that these durations of time are only examples and that other classifications can be used based on various categorization choices for spatial distribution probability value type, such as, urban as compared to suburban as compared rural, as well as the type of work that occurs within a building, e.g., a restaurant as compared to an office building as compared to a factory.

According to an embodiment, as described above, fingerprint positioning can be used as one of the possible types of positioning techniques to be enhanced using spatial distribution probability values. A high level description of various elements that are used in support of using both fingerprint information and additional probability information associated with the probability that there will be a user in a grid location is now described.

When signal strength of the measurement sample s on the 1, 2, . . . n cell is s1, s2, . . . , sn, the probability that the UE is located in one grid location can be calculated according to Bayes theorem, as shown below in Equation (4):

$$P(grid\,|\,(s1, s2, \ldots, sn)) = \frac{P(grid)*P((s1, s2, \ldots, sn)\,|\,grid)}{P(s1, s2, \ldots, sn)} \quad (4)$$

where P(s1, s2, . . . , sn) is the probability that the received signal strength on the 1, 2, . . . n cell is s1, s2, . . . sn;
P(grid) is the probability that there will be a user presence in the grid location, i.e., the spatial probability distribution value for that grid location; and
P((s1, s2, . . . , sn|grid) is the probability that the received signal strength on the 1, 2, . . . n cell is s1, s2, . . . sn when the UE is in this grid location and the variance is uncorrelated between different base stations.

For one known measurement sample s, P(s1, s2, . . . , sn) is the same for different grids. The received signal strength between different cells is uncorrelated, so P(s1, s2, . . . , sn|grid)=P(s1|grid)*P(s2|grid)* . . . *P(sn|grid). Then Equation (4) can be rewritten as shown below with respect to Equation (5):

$$P(grid|(s1,s2,\ldots,sn)) \propto P(grid)*(s1|grid)*P(s2|grid)* \ldots *(sn|grid) \quad (5)$$

where ∝ means "is directly proportional to".

If the database of fingerprint training signatures 304 is built by online data collection or MDT/RDT, when generating fingerprint training signatures for one grid, the number of measurements in the grid can indicate P(grid) and P(s1|grid),P(s2|grid), . . . , P(sn|grid) can be computed using fingerprint training signatures and measurement sample s. According to an embodiment, when P(grid) is calculated when the database of fingerprint training signatures 304 is built offline, P(grid) can be created from other services that collect the location of users such as various online map functions, e.g., Google Maps.

According to an embodiment, as described above, the positioning module 306 can reside in a location server 300 in a network and be used to create an estimated location of a UE (or user) by additionally using a calculated spatial distribution probability in addition to conventional positioning techniques to create a reduced area of potential user location which makes for a more accurate position location estimate. This typically occurs after a measurement sample for positioning has been sent to the positioning module 306. The steps described above of computing P((s1, s2, . . . , sn|grid), P(grid) and (grid|(s1, s2, . . . , sn)), as well as other features associated with the positioning module 306, will now be described.

Initially, the positioning module 306 receives the measurement sample which includes a plurality of signal strengths for different cells associated with a grid and various grid locations within the grid as a positioning request. This information is used to calculate a probability for each signal strength for the grid. The received signal strength between different cells is uncorrelated, so P(s1, s2, . . . , sn|grid)=P(s1|grid)*P(s2|grid)* . . . *P(sn|grid). According to an embodiment, one method for computing P(s1|grid),P(s2|grid), . . . , P(sn|grid) is described below.

Assume that the received signal strength follows Gaussian distribution in the grid as shown below with respect to Equation (6):

$$P[s1\,|\,grid) = \frac{1}{\sqrt{2\pi}\,\sigma 1} e^{\frac{(s1-\mu 1)^2}{\sigma 1^2}} \quad (6)$$

where: μ1 is the expectation of the received signal strength on cell1, which can be found in the database 304 of fingerprint training signatures; and
σ1² is the variance of the received signal strength on cell1 which can be found in the database 304 of fingerprint training signatures.

Then P(s2|grid), P(s3|grid), . . . , P(sn|grid) can be computed in the same way. Additionally, it is to be understood that Equation (6) is only a non-limiting example and that other Equations can be used to calculate P(s1|grid), P(s2|grid), P(s3|grid), . . . , P(sn|grid). Finally N fingerprint training signatures with the largest P(s1, s2, . . . , sn|grid) are selected. N is a constant which can be set to, e.g., 100, or another value as desired.

The positioning module 306 then obtains P(grid), which either can be calculated in near real time or calculated at some time in the past and retrieved from a database of spatial distribution probability values for each potential grid location. based on the N selected fingerprint training signatures. According to an embodiment, each fingerprint training signature has an associated time of day (which can be a range of times, e.g., morning and evening) and a number of measurement samples received during that time of day from that grid location. According to the current time of day at which the measurement request is being processed, the related time of day is found in the database to obtain the number of measurement samples received from that grid location at that time of day. For example, if the current time at which the positioning request is being processed is 10 AM on Monday, which is related to f working hours on a working day (which is how the time parameter associated with the spatial distribution probability is characterized in this non-limiting example), then the number of associated measurement samples received during that time period in each of the N grid locations can be retrieved from the database.

Figure 5:
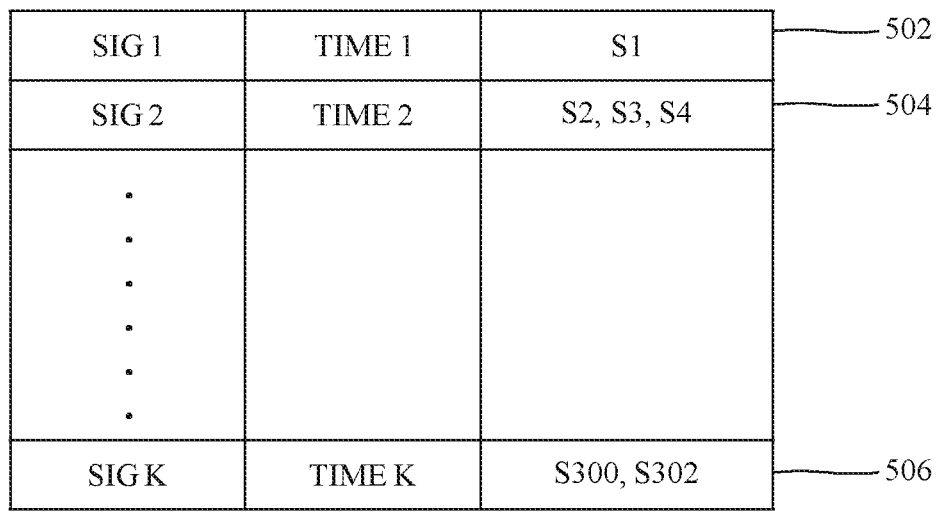
FIG. 5. illustrates a table for associating fingerprint training signatures with time and measurement samples according to an embodiment.

An example of a table or database which stores and associates fingerprint training signatures with time and measurement samples is shown in FIG. 5. FIG. 5 shows a table 500 which can include J fingerprint training signatures each of which is associated with a time and one or more measurement samples as shown for example in rows 502, 504 and 506. The table 500 can be stored, as desired, within the positioning module 306, elsewhere within the location server 300 or at another node as desired. Additionally, J is a constant where J is ≤N.

According to an embodiment, assuming the number of measurement samples in N selected grid locations is k1, k2, k3, ..., kN, then P(grid) in the $m^{th}$ grid can be determined as shown below with respect to Equation (7):

$$P(grid) = \frac{k_m}{k_1 + k_2 + \ldots + k_N} \quad (7)$$

Figure 6:
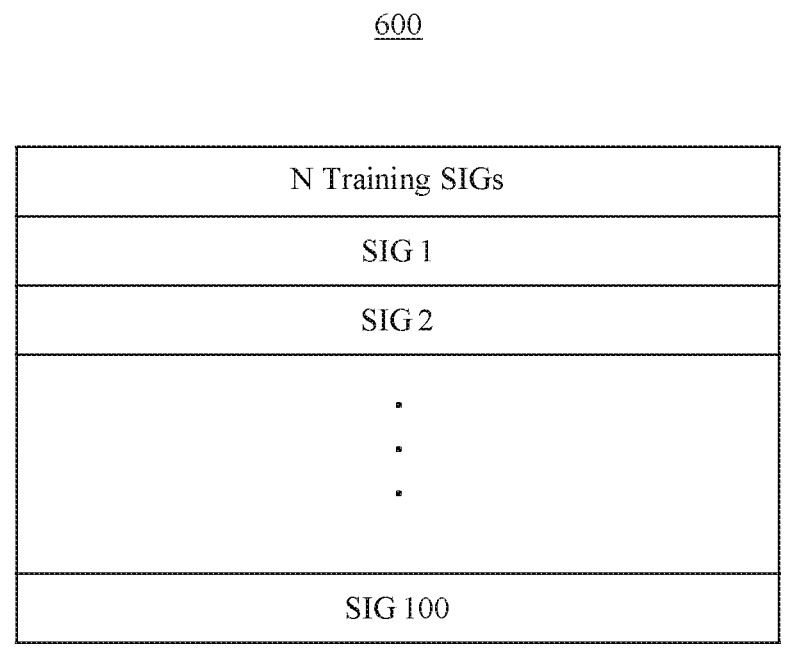
Figure 7:
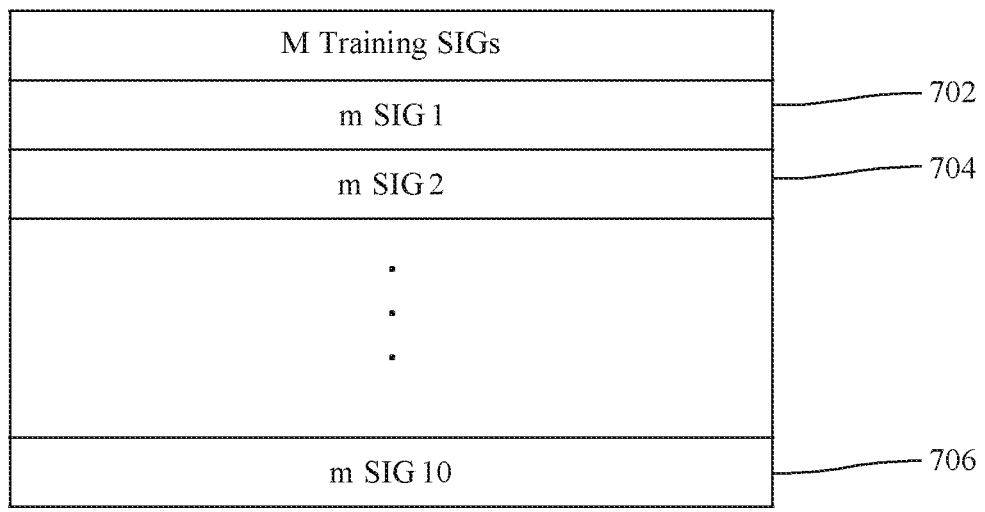
FIG. 7. shows a table of M training signatures.

After computing P(grid), then P(grid|(s1, s2, ..., sn)), P(grid|(s1, s2, ..., sn)) of the N selected training signatures can be calculated according to Equation (5) described above. Then the M signatures with largest P(grid|(s1, s2, ..., sn)) are selected as the candidates. M is a constant which can be set and is typically smaller than N, e.g., M can be 10, however other values which are less than N can also be used. Examples of the N selected signatures are shown in table 600 of FIG. 6 and the M selected signatures are shown in table 700 of FIG. 7. The M selected signatures, e.g., 702, 704 and 706, are denoted as "mSIG1" through "mSIG10" to indicate that they do not necessarily correspond to SIGs 1 through 10 of either the fingerprint signatures from the database 304 or the fingerprint training signatures from table 600 but instead are M, or for this example 10, trainings signatures selected from the N selected training signatures.

The location of the UE can then be estimated (as described above but reproduced here for clarity) but now also using a WKNN with the new probability inputs:

$$EstPos = \sum_{n=1}^{N}(w(n) * P(n)) \quad (8)$$

Note: Equation (8) is similar to Equation (2) except that the probability inputs are different since they have been refined using P(grid) as described above.

Figure 8:
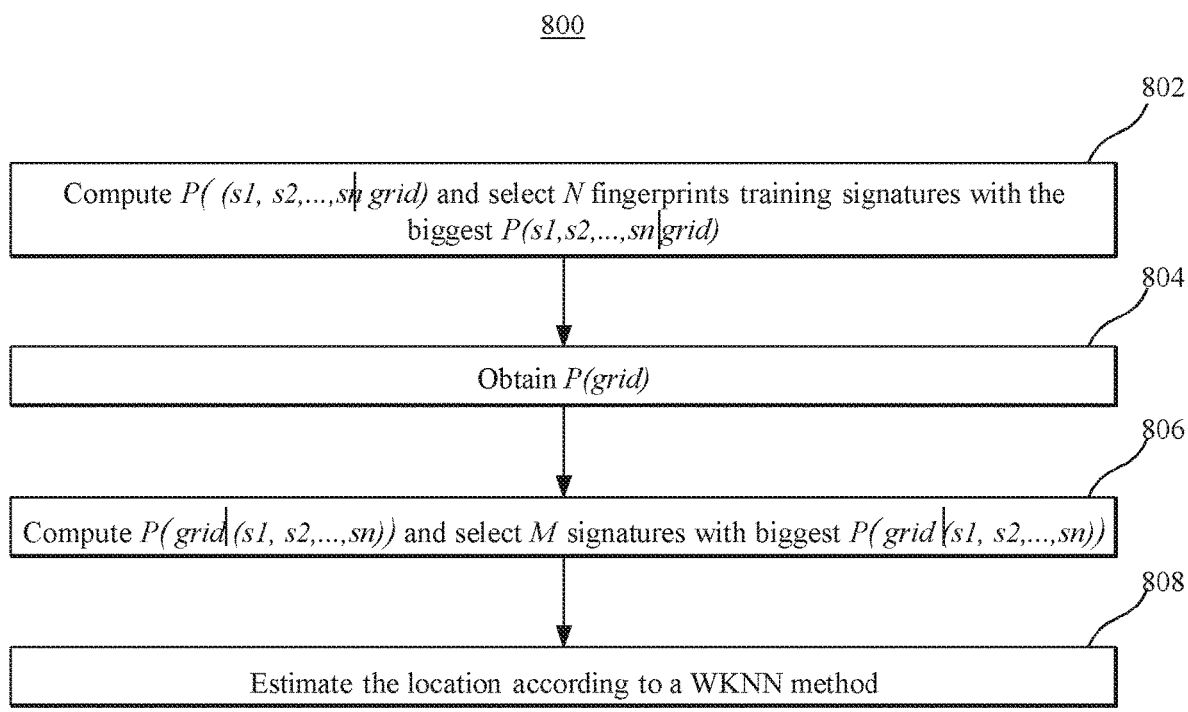
FIG. 8 is a flowchart of a method for estimating the location of a user according to an embodiment.

According to an embodiment, a method for estimating the location of a user or UE is shown in FIG. 8, which method can be performed in the positioning module 306. Initially, in step 802, compute P((s1, s2, ..., sn|grid) and select N fingerprint training signatures with the biggest P(s1, s2, ..., sn|grid). In step 804, obtain P(grid). P(grid) can be computed in near real time, or previously computed and fetched from the database of training signatures 304. In step 806, compute P(grid|(s1, s2, ..., sn)) and select M signatures with the largest P(grid|(s1, s2, ..., sn)) values and then, in step 808, estimate the location of the user or UE according to a Weighted K Nearest Neighbor (WKNN) algorithm. Thus, it can be seen that when estimating the location of the UE, both traditional positioning techniques, e.g., fingerprinting, and the inclusion of probabilities associated with a person being at a location (potentially influenced by time) can be used in the positioning module 306 of a location server 300 (or other network node as desired).

Figure 9:
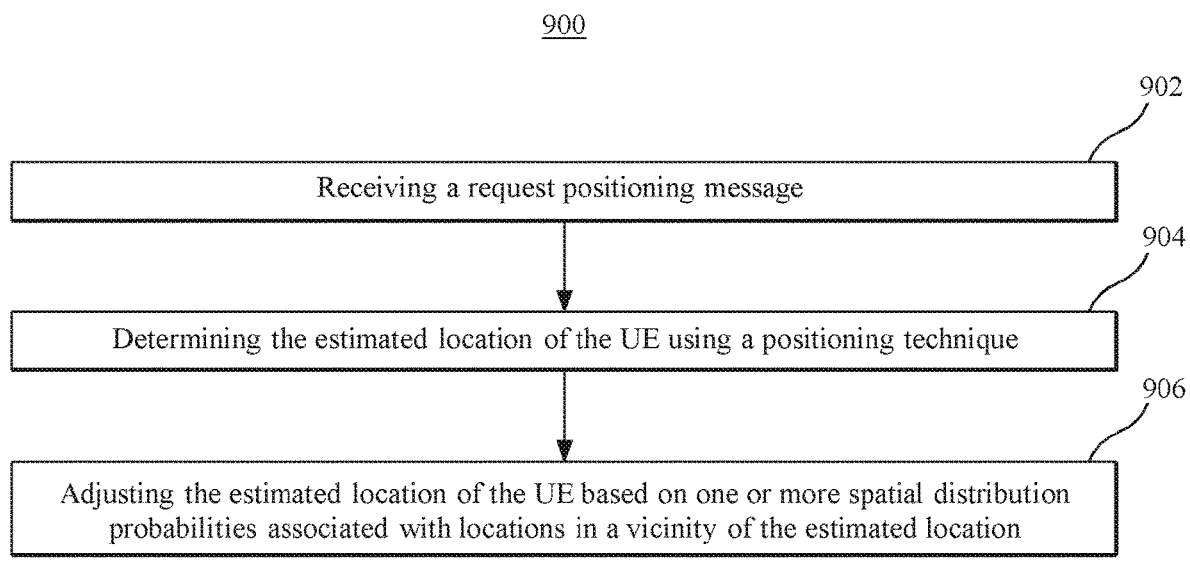
FIG. 9 is a flowchart of another method for estimating the location of a user according to an embodiment.

According to an embodiment, a method 900 for a network node in a wireless communication network for generating an estimated location of a user equipment (UE) is shown in FIG. 9. Initially, at step 902, receiving a request positioning message, at step 904, determining the estimated location of the UE using a positioning technique, and at step 906, adjusting the estimated location of the UE based on one or more spatial distribution probabilities associated with one or more locations in a vicinity of the estimated location.

Figure 1:
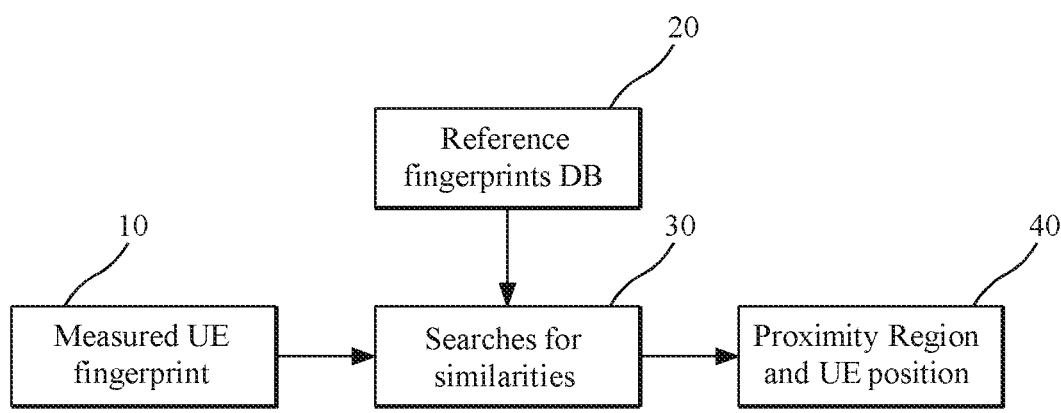
FIG. 1 illustrates a fingerprinting position technique.
Figure 2:
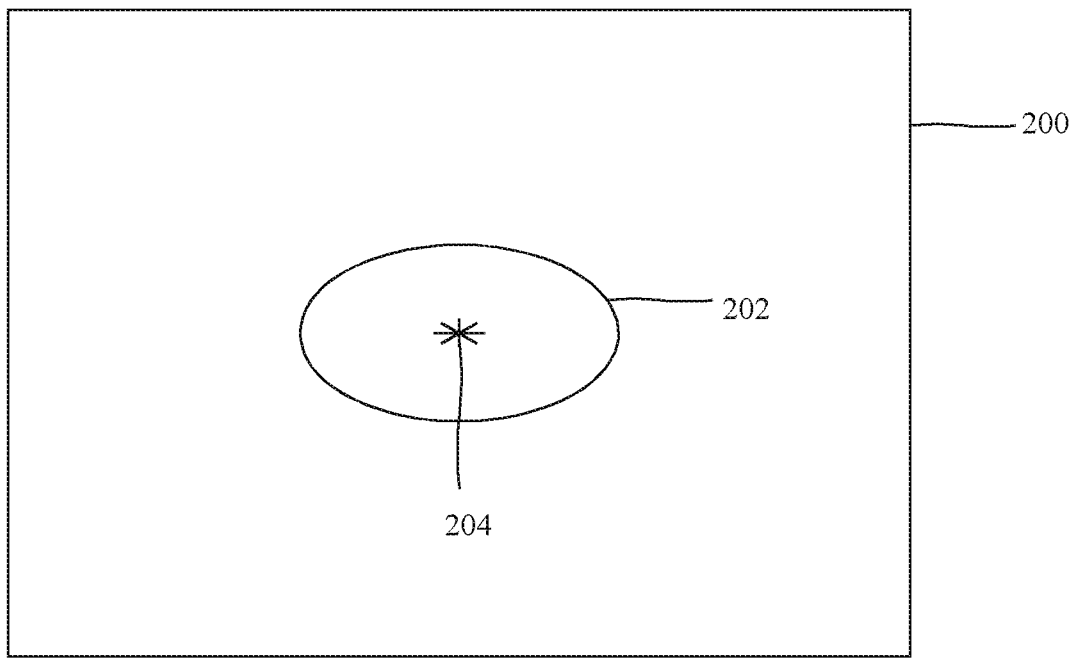
FIG. 2 illustrates an estimated user location and proximity region using the position technique of FIG. 1.
Figure 10:
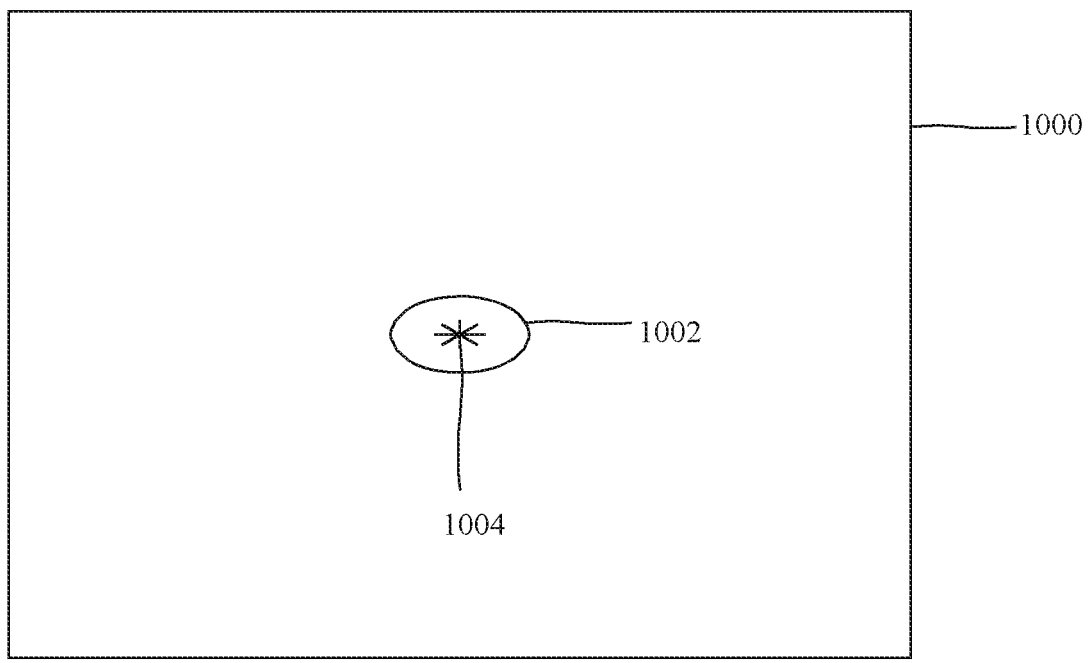
FIG. 10 illustrates an estimated user location and reduced proximity region according to an embodiment.

According to an embodiment, using the method described with respect to FIG. 9, the size or area of the proximity region can be reduced relative to conventional positioning techniques as shown in FIG. 10. FIG. 10 shows an area 1000, a reduced proximity region 1002 which is the area in which the UE (and hence the user) is located within and the estimated UE 1004 location for reference. As compared to conventional location techniques as shown, for example, in FIG. 2, FIG. 10 shows a reduced proximity region 1002 as compared to the proximity region 202. It will be appreciated by those skilled in the art that the relative sizes of proximity regions 202 and 1002 were arbitrarily selected to illustrate anticipated benefits of the embodiments and are not intended to be taken as actual or simulated results.

As described above, the examples for positioning techniques user herein describe using the fingerprinting positioning technique. However, other positioning techniques which can also use spatial distribution probabilities include, but are not limited to, timing advance, Cell Id, Enhanced Cell Id, Observed Time Difference of Arrival (OTDOA) and Uplink-Time Difference of Arrival (U-TDOA).

As described above, information can be sent to the location server 300 which includes data associated with gathering spatial distribution probabilities. This information can be gathered by UEs and in some cases, base stations can also provide some information. For example, a (UE) can be configured to transmit essentially real-time information associated with a grid location at which it is currently located, said information including at least one of the UEs' current location, measured signal strength, time, cell IDs detected by the UEs and quantized timing advance to a network node. Base Stations (BSs) or eNodeBs can also be used to gather some of this information as well as support delivery of the information from the UE to the location server 300.

Figure 11:
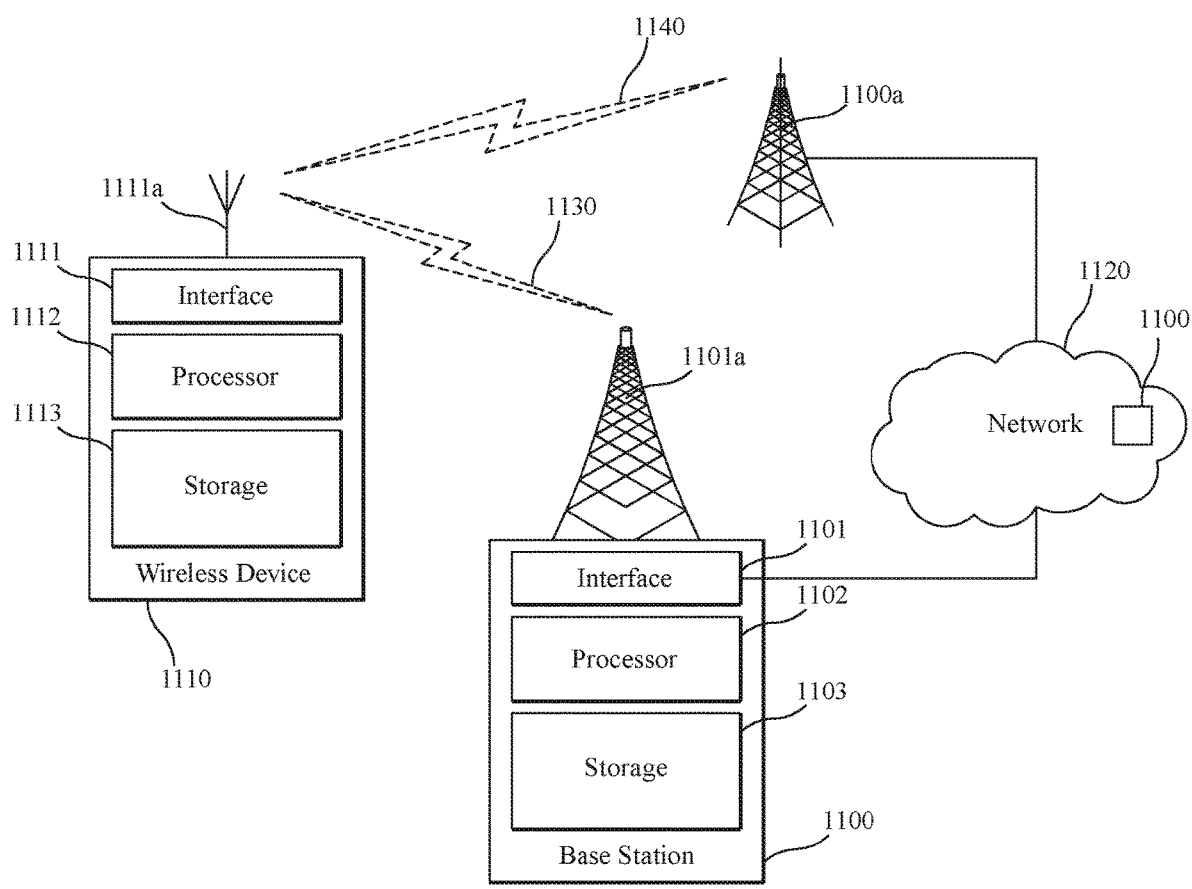
FIG. 11 depicts elements of a radio communication system according to an embodiment.

As another example of structural embodiments, FIG. 11 illustrates a wireless network comprising a more detailed view of network node 1100 and wireless device (WD) 1110, in accordance with an embodiment. For simplicity, FIG. 11 only depicts network 1120, network nodes 1100 and 1100a, and WD 1110, i.e., a UE. Network node 1100 comprises processor 1102, storage 1103, interface 1101, and antenna 1101a. Similarly, WD 1110 comprises processor 1112, storage 1113, interface 1111 and antenna 1111a. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 1120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 1100 comprises processor 1102, storage 1103, interface 1101, and antenna 1101a. These components are depicted as single boxes located within a single larger box. In practice however, a network node may comprise multiple different physical components that make up a single illustrated component (e.g., interface 1101 may comprise terminals for coupling wires for a wired connection and a radio transceiver for a wireless connection). As another example, network node 1100 may be a virtual network node in which multiple different physically separate components interact to provide the functionality of network node 1100 (e.g., processor 1102 may comprise three separate processors located in three separate enclosures, where each processor is responsible for a different function for a particular instance of network node 1100). Similarly, network node 1100 may be composed of multiple physically separate components (e.g., a NodeB component or gNB component and a RNC component, a BTS component and a BSC component, etc.), which may each have their own respective processor, storage, and interface components. In certain scenarios in which network node 1100 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 1100 may be configured to support multiple radio access technologies (RATs). In such embodiments, some components may be duplicated (e.g., separate storage 1103 for the different RATs) and some components may be reused (e.g., the same antenna 1101a may be shared by the RATs).

Processor 1102 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 1100 components, such as storage 1103, network node 1100 functionality. For example, processor 1102 may execute instructions stored in storage 1103. Such functionality may include providing various wireless features discussed herein to wireless devices, such as WD 1110, including any of the features or benefits disclosed herein.

Storage 1103 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 1103 may store any suitable instructions, data or information, including software and encoded logic, utilized by network node 1100. Storage 1103 may be used to store any calculations made by processor 1102 and/or any data received via interface 1101.

Network node 1100 also comprises interface 1101 which may be used in the wired or wireless communication of signalling and/or data between network node 1100, network 1120, and/or WD 1110. For example, interface 1101 may perform any formatting, coding, or translating that may be needed to allow network node 1100 to send and receive data from network 1120 over a wired connection. Interface 1101 may also include a radio transmitter and/or receiver that may be coupled to or a part of antenna 1101a. The radio may receive digital data that is to be sent out to other network nodes or WDs via a wireless connection. The radio may convert the digital data into a radio signal having the appropriate channel and bandwidth parameters. The radio signal may then be transmitted via antenna 1101a to the appropriate recipient (e.g., WD 1110).

Antenna 1101a may be any type of antenna capable of transmitting and receiving data and/or signals wirelessly. In some embodiments, antenna 1101a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 1110 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 1100 and/or other WDs via uplink signals or sidelink signals, respectively. WD 1110 comprises processor 1112, storage 1113, interface 1111, and antenna 1111a. Like network node 1100, the components of WD 1110 are depicted as single boxes located within a single larger box, however in practice a wireless device may comprises multiple different physical components that make up a single illustrated component (e.g., storage 1113 may comprise multiple discrete microchips, each microchip representing a portion of the total storage capacity).

Processor 1112 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 1110 components, such as storage 1113, WD 1110 functionality. Such functionality may include providing various wireless features discussed herein, including any of the features or benefits disclosed herein.

Storage 1113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 1113 may store any suitable data, instructions, or information, including software and encoded logic, utilized by WD 1110. Storage 1113 may be used to store any calculations made by processor 1112 and/or any data received via interface 1111.

Interface 1111 may be used in the wireless communication of signalling and/or data between WD 1110 and network node 1100. For example, interface 1111 may perform any formatting, coding, or translating that may be needed to allow WD 1110 to send and receive data from network node 1100 over a wireless connection. Interface 1111 may also include a radio transmitter and/or receiver that may be coupled to or a part of antenna 1111a. The radio may receive digital data that is to be sent out to network node 1101 via a wireless connection. The radio may convert the digital data into a radio signal having the appropriate channel and bandwidth parameters. The radio signal may then be transmitted via antenna 1111a to network node 1100.

Antenna 1111a may be any type of antenna capable of transmitting and receiving data and/or signals wirelessly. In some embodiments, antenna 1111a may comprise one or more omni-directional, sector or panel antennas operable to transmit/receive radio signals between 2 GHz and 66 GHz. For simplicity, antenna 1111a may be considered a part of interface 1111 to the extent that a wireless signal is being used.

Additionally, in some embodiments the non-limiting term UE is used and it refers to any type of wireless device communicating with a network node in a cellular or mobile communication system over radio interface. Examples of UEs are target devices, device to device (D2D) UEs, proximity-based service (ProSe) UEs, machine type UEs or UEs capable of machine to machine communication (aka category 0 UEs, low cost and/or low complexity UEs), PDAs, iPADs, tablets, mobile terminals, smart phones, laptop embedded equipment (LEE), laptop mounted equipment (LME), USB dongles, wireless devices etc. An example of a UE 1110 is illustrated in FIG. 11 including a processor 1102, radio transceiver 1104, and antenna 1106.

Various embodiments described herein refer to nodes. In some embodiments the non-limiting network node (also interchangeably called as node) is more commonly used and it refers to any type of network node which directly or indirectly communicates with the UE. It can be radio network node or a node in a core network or fixed part of the network such as the location server 300. For example, it can be a network node serving the UE, a network node neighboring to the serving network node of the UE, any network node in the radio network or in the core network in wireless communication system in which UE operates. Examples of network nodes are base stations (BS), multi-standard radio (MSR) radio nodes such as MSR BS, eNode B (eNB), network controllers, radio network controllers, base station controllers, relay, donor node controlling relays, base transceiver stations (BTS), access points (AP), core network nodes (e.g. MSC, MME etc), O&M, OSS, SON, location server (e.g. E-SMLC), MDT etc. It is to be understood that network node/location server 300 (which can be a 3GPP location server) includes functional pieces similar to those shown for base station 1100.

Figure 12:
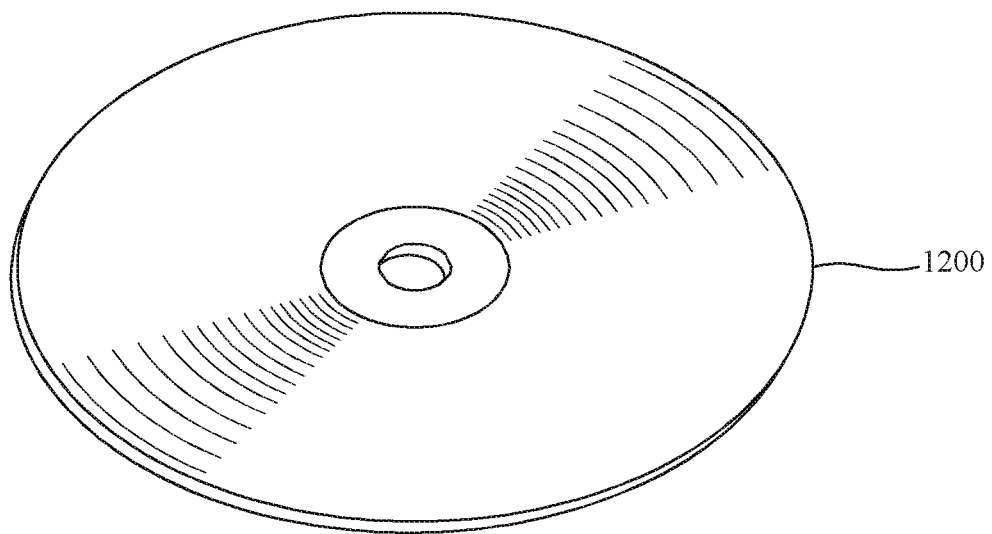
FIG. 12 depicts an electronic storage medium on which computer program embodiments can be stored.

Further, portions of the embodiments may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such as floppy disk or magnetic tape all of which can be generally described as "carriers" and example of which is shown as carrier 1200 in FIG. 12. Other non-limiting examples of computer-readable media include flash-type memories or other known memories.

The embodiments are described for LTE. However, the embodiments are applicable to any RAT or multi-RAT systems, where the UE receives and/or transmit signals (e.g. data) e.g. LTE FDD/TDD, WCDMA/HSPA, GSM/GERAN, Wi-Fi, WLAN, CDMA2000 etc.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for a network node in a wireless communication network for generating an estimated location of a user equipment (UE) comprising:
    receiving a request positioning message;
    in response to receiving the request positioning message, determining the estimated location of the UE using a positioning technique comprising:
        adjusting the estimated location, determined from the positioning technique, of the UE based on one or more spatial distribution probabilities associated with one or more locations in a vicinity of the estimated location comprising:
            calculating, for a plurality of grid locations and for a plurality of received signal strength values, a probability of that received signal strength being reported when the UE is located in that grid location, which results in a first set of probabilities;
            selecting N largest probabilities from the first set of probabilities;
            calculating the spatial distribution probability for each of the grid locations based on the N largest probabilities, which results in a second set of probabilities;
            selecting M largest probabilities from the second set of probabilities, wherein M is smaller than N; and
            generating the estimated location of the UE based on the M largest probabilities.

2. The method of claim 1, wherein the positioning technique is a fingerprinting positioning technique.

3. The method of claim 1, wherein the one or more spatial distribution probabilities associated with locations in the vicinity of the estimated location are based on at least one of time and geography.

4. The method of claim 3, wherein time includes information associated with at least one of daytime, nighttime, weekday and weekend.

5. The method of claim 3, wherein geography includes information associated with at least one of rural, suburban, urban, water and land.

6. The method of claim 1, further comprising:
    receiving, from a plurality of UEs, information associated with grid locations, the information including at least one of the UEs' current location, measured signal strength, time cell IDs detected by the UEs and quantized timing advance; and
    determining the spatial distribution of the plurality of UEs.

7. The method of claim 1, further comprising:
    receiving, from a plurality of UEs, non real-time information associated with grid locations, said information including information calculated based on collector based data from a predefined route.

8. The method of claim 1, wherein the positioning technique is one of timing advance, Cell Id, Enhanced Cell Id, Observed Time Difference of Arrival (OTDOA) and Uplink-Time Difference of Arrival (U-TDOA).

9. A network node in a wireless communication network for generating an estimated location of a user equipment (UE), the network node comprising:
    a receiver configured to receive a request positioning message;
    a processor configured to, in response to receiving the request positioning message, determine the estimated location of the UE using a positioning technique comprising:

adjusting the estimated location, determined from the positioning technique, of the UE based on one or more spatial distribution probabilities associated with one or more locations in a vicinity of the estimated location comprising:
  calculating, for a plurality of grid locations and for a plurality of received signal strength values, a probability of that received signal strength being reported when the UE is located in that grid location, which results in a first set of probabilities;
  selecting N largest probabilities from the first set of probabilities;
  calculating the spatial distribution probability for each of the grid locations based on the N largest probabilities, which results in a second set of probabilities;
  selecting M largest probabilities from the second set of probabilities, wherein M is smaller than N; and
  generating the estimated location of the UE based on the M largest probabilities.

10. The network node of claim 9, wherein the positioning technique is a fingerprinting positioning technique.

11. The network node of claim 9, wherein the one or more spatial distribution probabilities associated with locations in the vicinity of the estimated location are based on at least one of time and geography.

12. The network node of claim 11, wherein time includes information associated with at least one of daytime, nighttime, weekday and weekend.

13. The network node of claim 11, wherein geography includes information associated with at least one of rural, suburban, urban, water and land.

14. The network node of claim 9, further comprising:
  the processor configured to receive, from a plurality of UEs, information associated with grid locations, the information including at least one of the UEs' current location, measured signal strength, time cell IDs detected by the UEs and quantized timing advance; and
  the processor configured to determining the spatial distribution of the plurality of UEs.

15. The network node of claim 9, further comprising:
  the processor configured to receive, from a plurality of UEs, non-real time information associated with grid locations, said information including information calculated based on collector based data from a predefined route.

16. The network node of claim 9, wherein the positioning technique is one of timing advance, Cell Id, Enhanced Cell Id, Observed Time Difference of Arrival (OTDOA) and Uplink-Time Difference of Arrival (U-TDOA).

17. The network node of claim 9, wherein the network node is a location server.

18. A computer-readable storage medium containing a computer-readable code that when read by a computer causes the computer to perform a method generating an estimated location of a user equipment (UE) comprising:
  receiving a request positioning message;
  in response to receiving the request positioning message, determining the estimated location of the UE using a positioning technique comprising:
    adjusting the estimated location, determined from the positioning technique, of the UE based on one or more spatial distribution probabilities associated with one or more locations in a vicinity of the estimated location comprising:
      calculating, for a plurality of grid locations and for a plurality of received signal strength values, a probability of that received signal strength being reported when the UE is located in that grid location, which results in a first set of probabilities;
      selecting N largest probabilities from the first set of probabilities;
      calculating the spatial distribution probability for each of the grid locations based on the N largest probabilities, which results in a second set of probabilities;
      selecting M largest probabilities from the second set of probabilities, wherein M is smaller than N; and
      generating the estimated location of the UE based on the M largest probabilities.

19. An apparatus for generating an estimated location of a user equipment (UE) comprising:
  the apparatus being adapted to:
    receive a request positioning message;
    in response to receiving the request positioning message, determine the estimated location of the UE using a positioning technique comprising:
      adjusting the estimated location, determined from the positioning technique, of the UE based on one or more spatial distribution probabilities associated with one or more locations in a vicinity of the estimated location comprising:
        calculating, for a plurality of grid locations and for a plurality of received signal strength values, a probability of that received signal strength being reported when the UE is located in that grid location, which results in a first set of probabilities;
        selecting N largest probabilities from the first set of probabilities;
        calculating the spatial distribution probability for each of the grid locations based on the N largest probabilities, which results in a second set of probabilities;
        selecting M largest probabilities from the second set of probabilities, wherein M is smaller than N; and
        generating the estimated location of the UE based on the M largest probabilities.

* * * * *